United States Patent
Groeneweg

[11] 4,040,723
[45] Aug. 9, 1977

[54] OPTICAL APPARATUS FOR REPRODUCING A PAIR OF DATA IMAGES ON A COMMON PHOTOGRAPHIC PLANE

[75] Inventor: Abraham Groeneweg, Ridderkerk, Netherlands

[73] Assignee: N. V. Optische Industrie "De Oude Delft", Delft, Netherlands

[21] Appl. No.: 640,769

[22] Filed: Dec. 15, 1975

[30] Foreign Application Priority Data

Dec. 20, 1974 Netherlands .................. 7416674

[51] Int. Cl.² .................. G02B 17/00; G03B 17/24
[52] U.S. Cl. .................. 350/203; 350/204; 354/109; 250/476
[58] Field of Search ............... 350/203, 202, 286, 204; 354/62, 105, 106, 109, 110; 355/43; 250/476

[56] References Cited

U.S. PATENT DOCUMENTS

| 3,003,407 | 10/1961 | Grey | 350/204 |
| 3,192,840 | 7/1965 | Back et al. | 354/109 |
| 3,536,381 | 10/1970 | Pituley | 350/203 |
| 3,882,512 | 5/1975 | Lawrence | 354/109 |
| 3,928,863 | 12/1975 | Stewart | 354/109 |

*Primary Examiner*—John K. Corbin
*Assistant Examiner*—Conrad Clark
*Attorney, Agent, or Firm*—O'Brien & Marks

[57] ABSTRACT

An optical apparatus is disclosed which includes at least two optical systems for reproducing a plurality of data images on a common photographic plane. The systems are arranged to allow any desired orientation of the data images on the plane.

5 Claims, 1 Drawing Figure

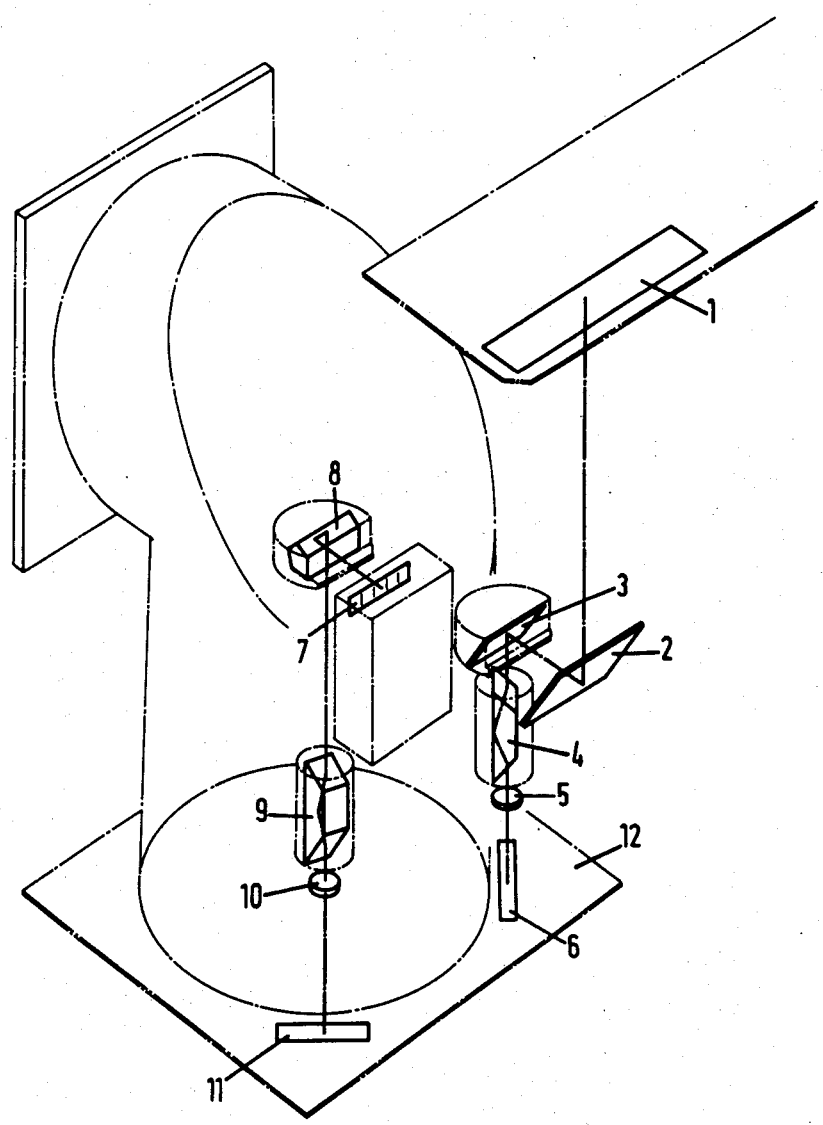

OPTICAL APPARATUS FOR REPRODUCING A PAIR OF DATA IMAGES ON A COMMON PHOTOGRAPHIC PLANE

The invention relates to an optical apparatus of the type including A first optical system for reproducing a first data image onto a plane and at least one second optical system having its optical axis extending in parallel with that of the first optical system for reproducing a second data image in that common plane.

Such apparatus can be used, for example, in hospitals in connection with X-ray photography procedures for reproducing, for example, administrative data of a patient by means of the first optical system on a planar information carrier, such as a photographic film, and for reproducing results of measurements performed to a part of the body of the patient during an examination, which results are converted into alpha-numerical form, by means of the second optical system on this same information carrier. In addition to these data, a picture of the part of the body in question, as produced by X-radiation, is also reproduced on the same photographic film.

While the orientation of the picture of the part of the body depends on the position of the camera relative to the patient, in the prior apparatus the first and second data images were always reproduced in one and the same orientation relative to the photographic film. Consequently, the orientation of the pictures of these data images relative to the photographic film does not depend on the position of the camera relative to the patient and does therefore not depend on the orientation of the picture of the part of the body relative to the photographic film.

Experience shows that the expert studying the developed photographic film for the evaluation of the examination is accustomed to orient the film relative to his eyes so that the picture of the examined part of the body has a predetermined orientation relative to his eyes. For example, in the case of photograph of the lungs of a patient the expert will hold this photograph so that he sees the right-hand lung on the right-hand side and the left-hand lung on the left-hand side of the photograph. As the orientation of the pictures of the first and second data is not correlative with the orientation of the picture of the examined part of the body, in the prior apparatus the problem may occur that, although the picture of the examined part has the orientation desired by the expert, the reproduced data images are mis-oriented and cannot be readily read by him. Often he will see these data in mirror or upside-down script.

It is an object of the present apparatus to eliminate this drawback. To this end the invention provides an optical apparatus of the type defined above, which is characterized in that each of the optical systems includes an image inverting and/or image rotating means arranged for rotation between discrete positions about the respective optical axis of the system, and that both systems include an optical element producing an even and odd number, respectively, of reflections, which elements are mounted to be interchangeable.

By rotating the image inverting or image rotating means in the first optical system, a picture of the first data image, which in the prior apparatus would be in upside-down relation with respect to the desired orientation of the picture of the examined part of the body, can be rotated through an angle so that this picture has an orientation corresponding to that of the picture of the part of the body. This also applies to the image inverting or image rotating means in the second optical system for the second data. By interchanging the two elements producing an even and odd number, respectively, of reflections it can be arranged so that the number of reflections in each of the systems changes an odd number of times, as a result of which the pictures of the first and second data, which in the prior apparatus would be in mirror-image relation with respect to the desired orientation of the picture of the examined part of the body, are reflected to have an orientation corresponding to that of the picture of the part of the body.

In a preferred embodiment of the apparatus according to the invention the element producing an even number of reflections includes a reflecting prism for establishing an even number of reflections, preferably a pentaprism, and/or the element producing an odd number of reflections includes a flat mirror.

When an image inverting means is used, this means will preferably be an inverting prism, while in the case of an image rotating means a fibre-optics element may be used to advantage. The inverting prism is preferably a Dove prism.

The invention will be described in detail hereinafter with reference to a single drawing showing the preferred embodiment of the present arrangement.

As shown in the drawing, the first optical system includes a flat mirror 3, a Dove prism 4 and a lens means 5, and serves for reproducing a first data image 1, for example the administrative data of a patient. The flat mirror constitutes the aforesaid element producing an odd number of reflections. The second optical system includes a pentaprism 8, a Dove prism 9 and a lens means 10, and serves for reproducing a second data image 7, for example the digits indicated by counter tubes and/or the digit rolls of an electromechanical counter. The pentaprism 8 constitutes the aforesaid element producing an even number of reflections and, just like the flat mirror 3, is mounted in such a holder that this prism 8 can be readily interchanged with the mirror 3. To this end, the holder of the pentaprism 8 preferably has an external shape identical to that of the holder of the flat mirror 3. Both Dove prisms 4 and 9 are mounted in holders arranged to be readily rotated between discrete positions about the respective optical axes of the optical systems. In principle, this rotation can be performed manually, but it will be clear that appropriate mechanical equipment may be provided for this purpose. The first optical system further includes a flat mirror 2 to provide that the total number of reflections in the two systems is even, which is desirable in the present instance as it is assumed that data images 1 and 7 are not in mirror script. It will be clear, however, that the presence of this mirror 2 is no essential feature of the invention.

During operation, the first and second data are reproduced within a first and second frame 6 and 11, respectively, of a photographic film segment 12 located in a plane perpendicular to the mutually parallel optical axes of the two systems. In the embodiment shown in the drawing, a picture of the examined part of the body of a patient will be formed in the central portion of the photographic film segment 12 by means of a separate reproducing device. As shown, the frames 6 and 11 are essentially striplike, the long sides of the strips extending at all times perpendicular to the diagonals of the film segment so as to promote convenient reading of the two pictures formed within frames 6 and 11.

As regards the prisms that may be included in the apparatus according to the invention, it is observed that the deflecting faces, which at the same time constitute the entrance and exit faces, of the Dove prisms 4 and 9 are perpendicular to each other. Thus by rotating a Dove prism through 90°, an optical rotation of the picture through 180° is achieved. The entrance and exit faces of pentaprism 8 are perpendicular to each other, while the two reflective faces are at angles at 112.5° to the respective entrance and exit faces.

Self-evidently, appropriate means, such as flash lamps, are provided for illuminating the first and second data.

I claim:

1. An optical apparatus for reproducing at least two independent data images on a common plane and adapted for use along with apparatus for producing a photographic image on that plane comprising
    a first optical system for reproducing the first data image on the common plane and having an optical axis generally perpendicular to that plane,
    first image rotating and inverting means in the first optical system arranged for rotation between discrete positions about the optical axis thereof,
    a second optical system for reproducing the second data image on the common plane and having an optical axis generally parallel to the optical axis of the first optical system,
    second image rotating and inverting means in the second optical system arrange for rotation between discrete positions about the optical axis thereof, and
    a pair of interchangeable optical elements, a first of which produces an even number of reflections and a second of which produces an odd number of relections, a one of the pair of optical elements being included in each of the first and second optical systems respectively, the pair of optical elements being mounted so that they are interchangeable.

2. An optical apparatus as claimed in claim 1 wherein the first element of the pair of optical elements is a reflecting prism and wherein the second element of the pair of optical elements is a flat mirror.

3. An optical apparatus as claimed in claim 2 wherein the first element of the pair of optical elements is a pentaprism.

4. An optical apparatus as claimed n claim 1 wherein both the first and second image rotating and inverting means include inverting prisms therein.

5. An optical apparatus as claimed in claim 4 wherein the inverting prisms are Dove prisms.

* * * * *